(12) United States Patent
Jackson et al.

(10) Patent No.: US 9,983,402 B1
(45) Date of Patent: May 29, 2018

(54) FORWARD-ON-FORWARD HIGH DYNAMIC RANGE ARCHITECTURE FOR DIGITAL MICROMIRROR DEVICES

(71) Applicant: CHRISTIE DIGITAL SYSTEMS USA, INC., Cypress, CA (US)

(72) Inventors: John David Jackson, Allen, TX (US); Michael Perkins, Kitchener (CA); Mark Lamm, Mississagua (CA); Joseph Ma, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days. days.

(21) Appl. No.: 15/434,635

(22) Filed: Feb. 16, 2017

(51) Int. Cl.
*G02B 26/08* (2006.01)
*G02B 26/10* (2006.01)
*H04N 9/31* (2006.01)

(52) U.S. Cl.
CPC ....... *G02B 26/0833* (2013.01); *G02B 26/101* (2013.01); *H04N 9/315* (2013.01)

(58) Field of Classification Search
CPC .... G03B 21/008; G03B 21/28; G03B 21/147; G03B 21/208; G03B 26/101; G03B 26/0833; H04N 5/7416; H04N 5/7458
See application file for complete search history.

(56) References Cited

U.S. PATENT DOCUMENTS

| 4,436,392 A | 3/1984 | Vanderwerf |
| 5,321,259 A | 6/1994 | Morgan |
| 6,935,751 B2 | 8/2005 | Rieche et al. |
| 7,431,460 B2 | 10/2008 | Hall, Jr. et al. |
| 9,232,172 B2 | 1/2016 | Perkins et al. |
| 2005/0185249 A1* | 8/2005 | Uchiyama .......... G02B 13/0095 359/291 |
| 2007/0057164 A1 | 3/2007 | Vaughnn et al. |
| 2012/0206697 A1* | 8/2012 | Lee ........................ G03B 21/14 353/82 |
| 2013/0321475 A1 | 12/2013 | Perkins et al. |
| 2015/0124337 A1* | 5/2015 | Ito ..................... G02B 13/0095 359/733 |
| 2015/0219500 A1* | 8/2015 | Maes ................... H04N 9/3194 353/33 |

FOREIGN PATENT DOCUMENTS

| EP | 2402797 A2 | 1/2012 |
| JP | 2007163547 | 6/2007 |
| WO | 0105146 A1 | 1/2001 |

* cited by examiner

*Primary Examiner* — Sultan Chowdhury
(74) *Attorney, Agent, or Firm* — Perry + Currier, Inc.

(57) ABSTRACT

A forward-on-forward high dynamic range architecture for digital micromirror devices device is provided. In particular, provided herein is a device that includes two digital micromirror devices (DMDs), each operated in a forward configuration, such that each is illuminated at a respective non-normal angle and a respective output image is reflected at a normal angle, a subject plane of a first DMD being parallel to the first DMD. Optics between the DMDs are configured to convey light reflected from the first DMD to illuminate an image plane at a second DMD in the forward configuration, the optics including an equivalent lens plane. At least one optical device between the DMDs is configured to: tilt the subject plane of the first DMD to an equivalent tilted subject plane, the equivalent lens plane, the equivalent tilted subject plane and the image plane all intersecting at a Scheimpflug intersection.

16 Claims, 5 Drawing Sheets

FORWARD-ON-FORWARD HIGH DYNAMIC RANGE ARCHITECTURE FOR DIGITAL MICROMIRROR DEVICES

The specification relates generally to digital micromirror devices, and specifically to a forward-on-forward high dynamic range architecture for digital micromirror devices.

BACKGROUND

High dynamic range ("HDR"), and/or high contrast, projectors attempt to maximize contrast between black portions of projected images and white portions of projected images. Some HDR projectors are based on digital micromirror devices ("DMD", such as Digital Light Processing or DLP™), and the high dynamic range is achieved with two stages of imaging: a first pre-modulator DMD that creates an initial "normal" contrast version of an image and a second prime imaging DMD that re-images the initial "normal" contrast version of the image from the first DMD, a second time (which can be at a higher resolution), to create blacker blacks in the final image and thus increasing the final image contrast.

Existing architectures of such HDR projectors use the first DMD in a reverse configuration and the second DMD in a forward configuration. In the forward configuration, which is the configuration in which most DMDs are designed to operate, a DMD is illuminated at an angle to a plane of the DMD and an image formed by the DMD is reflected normal (perpendicular) to the plane of the DMD. However, in the reverse configuration, a plane of the DMD is illuminated perpendicularly, and an image formed by the DMD is reflected at an angle to the plane.

Operating the first DMD in the reverse configuration in HDR projectors has been necessary when using traditional projection optics because of the Scheimpflug principle, which describes under what conditions it is possible to focus two optical planes onto each other to achieve acceptable focus of light from the first DMD onto the second DMD. Indeed, if the first DMD were operated in the forward configuration using traditional optics, a subject plane of the first DMD could not be focussed on the second DMD, other than in a narrow region. As a result, the first DMD in existing-architecture HDR projectors is operated in the reverse configuration. However, operating the first DMD in the reverse configuration results in a system that is significantly less optically efficient, due to diffractive effects of the DMD mirror array, which acts as a blaze grating, and which can lead to increases in projector cost, size, noise and power consumption.

SUMMARY

In general, this disclosure is directed to a system and/or device for a high dynamic range ("HDR") projector that includes a first pre-modulator digital micromirror device ("DMD") and a second prime-modulator DMD, each operated in a forward configuration. The system includes optics which convey light from the first DMD to the second DMD, and at least one optical device which tilt a subject plane of the first DMD to an equivalent tilted subject plane, an equivalent lens plane of the optics, the equivalent tilted subject plane and an image plane of the second DMD all intersecting at a Scheimpflug intersection.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . ." and "one or more . . ." language.

An aspect of the specification provides a device comprising: a first digital micromirror device (DMD) and a second DMD each operated in a forward configuration, such that each is illuminated at a respective non-normal angle and a respective output image is reflected at a normal angle, a subject plane of the first DMD being parallel to the first DMD; optics between the first DMD and the second DMD, the optics configured to convey light reflected from the first DMD to illuminate an image plane at the second DMD in the forward configuration, the optics including an equivalent lens plane; and at least one optical device between the first DMD and the second DMD, the at least one optical device configured to: tilt the subject plane of the first DMD to an equivalent tilted subject plane, the equivalent lens plane, the equivalent tilted subject plane and the image plane all intersecting at a Scheimpflug intersection.

In some implementations, the at least one optical device is further configured to: tilt the subject plane of the first DMD to the equivalent tilted subject plane such that the image plane at the second DMD is in uniform focus at the respective non-normal angle.

In some implementations, the at least one optical device includes a prism with an exit face at an angle tilted relative to the subject plane of the first DMD.

In some implementations, the at least one optical device includes a plurality of wedge prisms distributed between the first DMD and the second DMD.

In some implementations, the at least one optical device includes a prism configured to convey illumination light to the subject plane of the first DMD at the respective non-normal angle and convey the respective output image through an exit face of the prism, the exit face at an angle relative to the subject plane, the angle being greater than zero, and the angle selected to optically tilt the subject plane of the first DMD to the equivalent tilted subject plane.

In some implementations, the optics includes a prism configured to convey illumination light from the first DMD to the image plane of the second DMD at the respective non-normal angle and convey the respective output image of the second DMD through a respective exit face.

In some implementations, the optics includes one or more lenses.

In some implementations, the optics includes one or more apertures.

In some implementations, the first DMD is further operated in a pre-modulator mode and the second DMD is further operated in a prime-modulator mode. In some these implementations, the first DMD is modulated using first image data, and the second DMD is modulated using second image determined from one or more of the first image data, a target projected image and a pixel spread function of the device.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
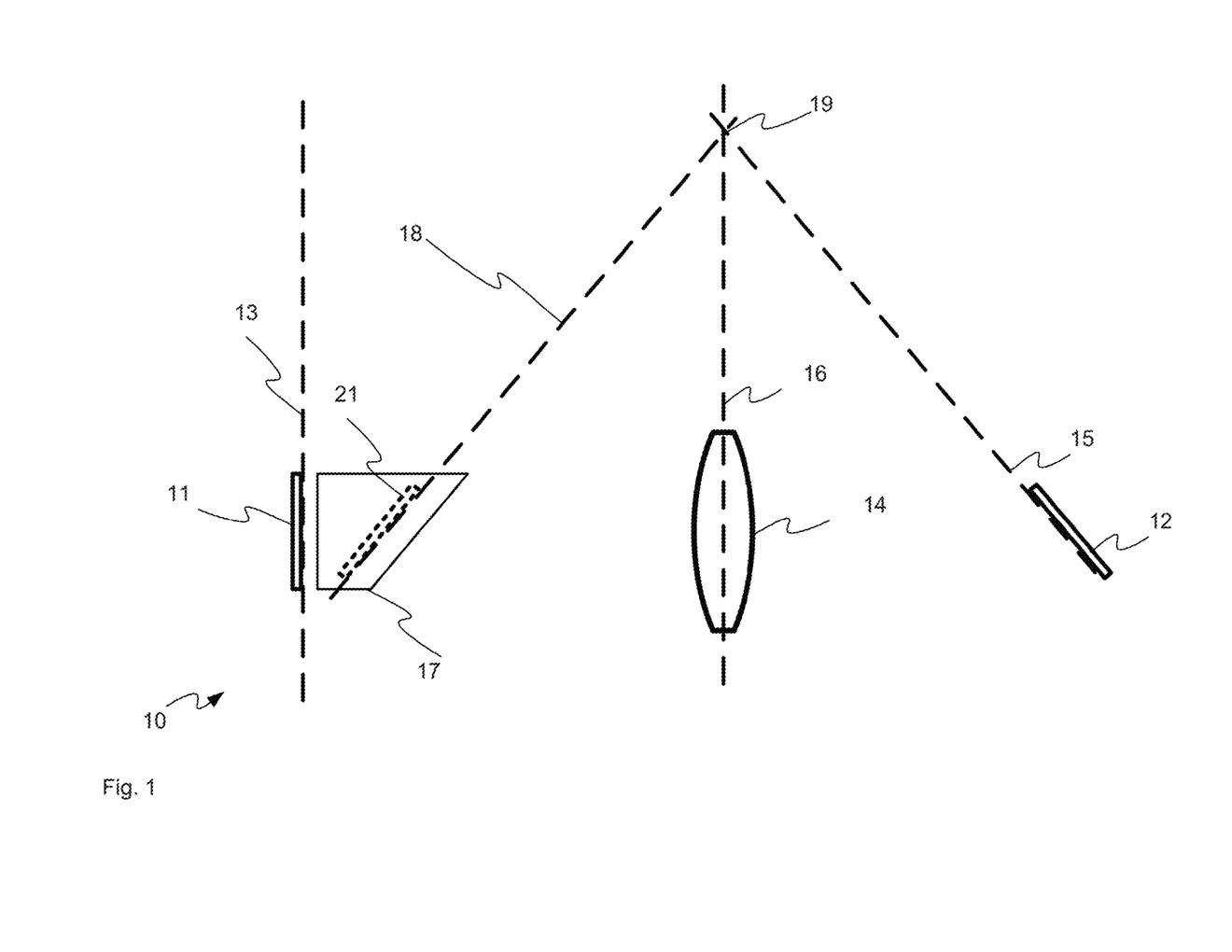
FIG. 1 depicts a schematic side view of a device for use with a high dynamic range projector, the device including two DMDs, each operated in a forward configuration, optics which convey light reflected from the first DMD to illuminate an image plane at the second DMD in the forward configuration, and at least one optical device between the first DMD and the second DMD, the at least one optical device configured to: tilt a subject plane of the first DMD to an equivalent tilted subject plane, an equivalent lens plane of the optics, the equivalent tilted subject plane and the image plane all intersecting at a Scheimpflug intersection, according to non-limiting implementations

FIG. 1 depicts a device 10 comprising: a first digital micromirror device (DMD) 11 and a second DMD 12 each operated in a forward configuration, such that each is illuminated at a respective non-normal angle and a respective output image is reflected at a normal angle, a subject plane 13 of the first DMD 11 being parallel to the first DMD 11; optics 14 between the first DMD 11 and the second DMD 12, the optics 14 configured to convey light reflected from the first DMD 11 to illuminate an image plane 15 at the second DMD 12 in the forward configuration, the optics 14 including an equivalent lens plane 16; and at least one optical device 17 between the first DMD 11 and the second DMD 12, the at least one optical device 17 configured to: tilt the subject plane 13 of the first DMD 11 to an equivalent tilted subject plane 18, the equivalent lens plane 16, the equivalent tilted subject plane 18 and the image plane 15 all intersecting at a Scheimpflug intersection 19.

In other words, the equivalent lens plane 16, the equivalent tilted subject plane 18 and the image plane 15 meet a Scheimpflug condition such that light from the first DMD 11 is in uniform focus and/or is in substantially uniform focus at the second DMD 12 and/or at the image plane 15. Put another way, the equivalent lens plane 16, the equivalent tilted subject plane 18 and the image plane 15 meet a Scheimpflug condition such that light imaged onto the second DMD 12, from the first DMD 11, has a uniform pixel spread function (PSF) across the second DMD 12.

The at least one optical device 17 has the effect of tilting the subject plane 13 of the first DMD 11 to appear tilted with respect to the optics 14 and/or the second DMD 12 such that the Scheimpflug condition can be met. Indeed, optically, the first DMD 11 "appears" to be located at the equivalent tilted subject plane 18, as indicated by virtual DMD 21 located inside the at least one optical device 17.

As depicted, the at least one optical device 17 includes a prism with an exit face at an angle tilted relative to the subject plane 13 of the first DMD 11. The result is that the at least one optical device 17 tilts the subject plane 13 of the first DMD 11 to the equivalent tilted subject plane 18 such that the image plane 15 at the second DMD 12 is in uniform focus and/or is in substantially uniform focus at at the respective non-normal angle (e.g. a PSF across the second DMD 12 is uniform).

Put yet another way, without the at least one optical device 17 the subject plane 13 of the first DMD 11 could not be uniformly focussed onto the second DMD 12 (e.g. non-uniform PSF) as, with the subject plane 13 being about parallel to the equivalent lens plane 16 of the optics 14, the Scheimpflug condition is impossible to meet. However, in order to operate the first DMD 11 in the forward configuration, the subject plane 13 of the first DMD 11 must be about parallel to the equivalent lens plane 16 of the optics 14. Hence, the at least one optical device 17 enables the use of both DMDs 11, 12 in the forward configuration such that the Scheimpflug condition can be met.

As depicted, the optics 14 includes a single lens, however, it is appreciated that such a depiction represent a simplification of the optics 14, and furthermore, device 10 is represents a simplification of devices used in projectors.

Figure 2:
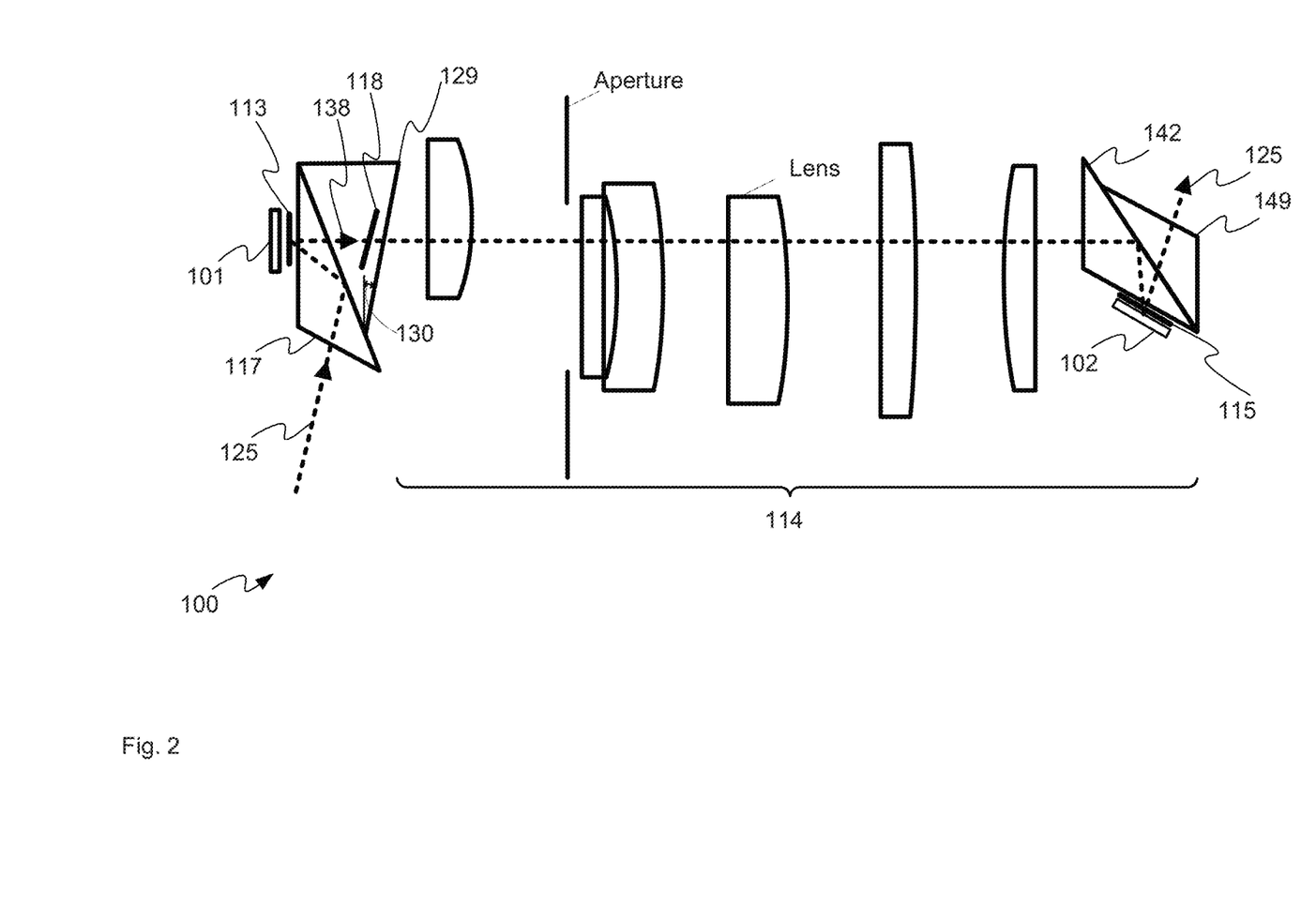
FIG. 2 depicts a specific implementation of the device of FIG. 1, according to non-limiting implementations.
Figure 3:
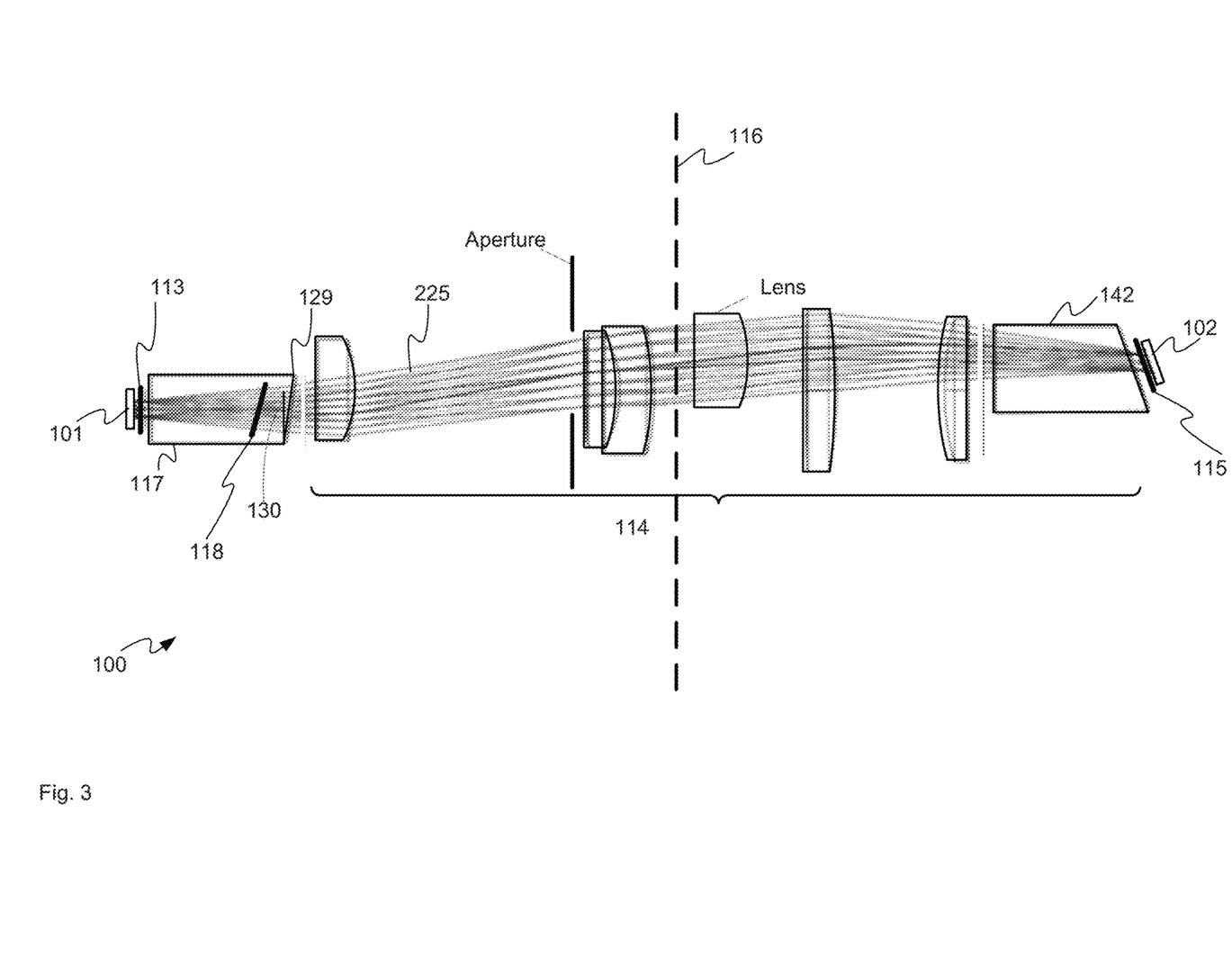
FIG. 3 depicts an unfolded version of the optics of the device of FIG. 2, along with a ray-trace diagram through the device, according to non-limiting implementations.

Hence, attention is next directed to FIG. 2 and FIG. 3, each of which depict a device 100 that can be used with, and/or incorporated into, a high dynamic range ("HDR") projector. FIG. 2 depicts a schematic side view of the device 100, including example optics, and FIG. 3 depicts a schematic side view of the device 100 with the optics of the device 100 unfolded (e.g. reflections from mirrors and/or reflective surfaces are removed for clarity with the optical path through the device 100 depicted without reflections), as well as a ray-trace diagram for three points at the first DMD 101, through the device 100. Furthermore, it is understood that the device 100 is not depicted to scale in either of FIG. 2 or FIG. 3. While device 100 is generally more complex than device 10, device 100 generally operates according to the same principles of device 10, as described hereafter.

Furthermore, in FIG. 2, an optical path 125 through the device 100 is depicted, and in FIG. 3 an unfolded optical path 225 between the DMDs 101, 102 is depicted schematically.

With reference to both FIG. 2 and FIG. 3, the device 100 generally comprises: a first DMD 101, a second DMD 102, each operated in a forward configuration, such that each is illuminated at a respective non-normal angle and a respective output image is reflected at a normal angle, a subject plane 113 of the first DMD 101 being parallel to the first DMD 101; optics 114 between the first DMD 101 and the second DMD 102, the optics 114 configured to convey light reflected from the first DMD 101 to illuminate an image plane 115 at the second DMD 102 in the forward configuration, the optics 114 including an equivalent lens plane 116; and at least one optical device 117 between the first DMD 101 and the second DMD 102, the at least one optical device 117 configured to: tilt the subject plane 113 of the first DMD 101 to an equivalent tilted subject plane 118, the equivalent lens plane 116, the equivalent tilted subject plane 118 and the image plane 115 all intersecting at a Scheimpflug intersection (not depicted, but assumed to be nonetheless present, for example off the page of FIG. 3).

It is appreciated that the relative locations of the subject plane 113, the equivalent lens plane 116, the equivalent tilted subject plane 118 and the image plane 115 are depicted in FIG. 3 without intervening reflecting surfaces (as in FIG. 2). For example, in the unfolded view of device 100 in FIG. 3, the relative angles between the subject plane 113, the equivalent lens plane 116, the equivalent tilted subject plane 118 and the image plane 115 are clearer as reflections due to mirrors and/or reflecting surfaces are removed. The equivalent lens plane 116 is depicted in FIG. 3, but not FIG. 2, for clarity.

As with at least one optical device 17, at least one optical device 117 is further configured to: tilt the subject plane 113 of the first DMD 101 to the equivalent tilted subject plane 118 such that the image plane 115 at the second DMD 102 is uniformly focussed at the respective non-normal angle.

As depicted, the at least one optical device 117 includes a prism with an exit face 129 at an angle 130 tilted relative to the subject plane of the first DMD 101

It is further assumed in FIG. 2 and FIG. 3 that the first DMD 101 is illuminated by respective illumination light as indicated by path 125 incident on the first DMD 101, for example from a light source (not depicted) of a projector (not depicted), and the like. The illumination light generally comprises one or more of white light, red light, green light, blue light, infrared light, ultraviolet light and the like, having an aspect ratio similar to an aspect ratio of the first DMD 101. In some implementations, the illumination light comprises a series of colors of illumination light, for example two or more of a red light, a green light and a blue light that illuminates the first DMD 101 in a sequence. For example, the device 100 can be a component of a single-chip imaging projector (e.g. one each of a pre-modulator DMD (e.g. the first DMD 101) and a prime-modulator DMD (e.g. the second DMD 102)), a two-chip imaging projector (e.g. two each of a pre-modulator DMD and a prime modulator DMD), and a three-chip imaging projector (e.g. three each of a pre-modulator DMD and a prime modulator DMD).

Furthermore, an aspect ratio of each of the first DMD 101 and the second DMD 102 can be similar or different. For example, different aspect ratios can be used when the first DMD 101 is under filled.

Either way, it is assumed that the first DMD 101 can further operate in a pre-modulator mode and the second DMD 102 can further operate in a prime-modulator mode. In other words, each of the first DMD 101 and the second DMD 102 can be modulated using similar image data. For example, the first DMD 101 can be modulated using first image data, and the second DMD 102 can be modulated using second image data which can comprise the first image data such that regions of the second DMD 102 that correspond to dark areas of the image being generated for projection are illuminated by light from the first DMD 101 having a similar level of brightness, in order to achieve a high dynamic range. For example, DMDs 101, 102 are operated in order to illuminate non-white pixels of the second DMD 102 with corresponding non-white light from the first DMD 101 and/or to not illuminate black pixels of the second DMD 102. The image data used to modulate the second DMD 102 operated in a prime-modulator mode can be calculated using a target image to be projected as well as data defining the first DMD 101 operated in a pre-modulator mode (which effectively is a light source for illuminating the second DMD 102). In non-HDR projection there is no pre-modulator (e.g. no first DMD 101) and illumination light on a prime-modulator (e.g. the second DMD 102) is assumed to be uniform. In HDR projection the input light to prime-modulator (e.g. the second DMD 102) is intentionally not uniform to achieve very black HDR blacks. So, given this non-uniformity, the image data, used to modulate the first DMD 101 operated in a pre-modulator mode, is determined to be whatever is needed to yield the target image to be projected (assuming illumination light is uniformly focussed and/or is substantially uniformly focussed at the first DMD 101).

Mathematically, the target image is divided by the pre-image data to yield the prime-image data, which can be mathematically expressed as:

$$\text{OutImage} = (\text{PremodImage} \otimes \text{PSF}) \times \text{PrimeImage}.$$

where OutImage is the target image to be projected, PremodImage is the image to be provided at the first DMD 101 operated in the pre-modulator mode, PSF is the pixel spread function of device 100, and PrimeImage is the image to be provided at the second DMD 102 operated in the prime-modulator mode. Hence, given a target image (e.g. OutImage), and the PSF, the prime and premod images can be calculated to minimize the errors between the target and a source image.

With further reference to FIG. 2 and FIG. 3, the first DMD 101 is operated in a forward configuration, such that illumination light is received at a subject plane 113 of the first DMD 101 at a non-normal angle and a respective output image is reflected from the first DMD 101 at a normal angle (e.g. optical path 125 is normal and/or perpendicular to a plane of the first DMD 101, as represented by arrow 138, and/or subject plane 113 is parallel to the plane of the first DMD 101). A prism (e.g. a total internal reflection (TIR) prism) of the at least one optical device 117 is configured to convey the illumination light to the subject plane 113 of the first DMD 101 at the non-normal angle and convey the respective output image through an exit face 129 of the prism of the at least one optical device 117.

It is further appreciated that while the prism of the at least one optical device 117 is configured to both convey light to the first DMD 101 and also to tilt the subject plane 113 of the first DMD 101 to the equivalent tilted subject plane 118, in other implementations a prism (e.g. a TIR prism) can be used to convey light to, and away from, the first DMD 101, and at least one optical device 117 can be a component separate from such a prism. For example, device 100 can include a TIR prism with an exit face parallel to the subject plane 113, and a separate wedge prism located after the exit face configured to tilt the subject plane 113 of the first DMD 101 to the equivalent tilted subject plane 118. Alternatively, such wedge prism can be located within optics 114, as long as the equivalent lens plane 116, the equivalent tilted subject plane 118 and the image plane 115 all intersect at a Scheimpflug intersection.

The exit face 129 is at an angle 130 relative to the subject plane 113, the angle 130 being greater than zero (e.g. not parallel to the subject plane 113 of the first DMD 101). The angle 130 is selected to tilt the subject plane 113 of the first DMD 101 to the equivalent tilted subject plane 118, similar to the operation of device 10. The second DMD 102 is also operated in the forward configuration, such that the image plane 115 intersects the equivalent tilted subject plane 118 and the equivalent lens plane 116 of the optics 114 to meet the Scheimpflug condition.

As depicted, device 100, the optics 114 include a prism 142 configured to convey illumination light from the first DMD 101 (e.g. from the equivalent tilted subject plane 118) to the image plane 115 of the second DMD 102 at the respective non-normal angle (as best seen in FIG. 3) and convey the respective output image of the second DMD 102 through a respective exit face 149 of the prism 142 (as best seen in FIG. 2, and represented by optical path 125 reflected away from the second DMD 102 through prism 142.

While not depicted, it is assumed that light along each of paths 125, 225 is for on-state light and that off-state light is reflected out of device 100 and/or into respective light dump devices (e.g. one for each of DMDs 101, 102). In other words, while not depicted, it is assumed that device 100 can include such light dump devices and at least one optical device 117 and prism 142 can be adapted to convey respective off-state light from each of DMDs 101, 102 to respective light dump devices.

Optics 114 between the DMDs 101, 102 can comprise one or more lenses, apertures and the like. As depicted, the optics 114 comprises five lenses and one aperture. Regardless, it is appreciated that optics 114 can be effectively modeled with a lens similar to the optics 14 depicted in FIG. 1, with an equivalent lens plane 116.

Furthermore, the lenses generally image the equivalent tilted subject plane 118 onto the image plane 115 such that the PSF of device 100 at the image plane 115 is generally uniform. Optionally, the optics 114 can collimate the light at the equivalent tilted subject plane.

In general, the angle 130 and the optics 114 are further selected to both meet the Scheimpflug condition and to meet physical constraints of a projector into which device 100 is integrated.

It is further appreciated that in selecting the angle 130 and the optics 114 the illumination angle of the second DMD 102 is considered. In other words, DMDs are generally designed to be operated in a forward configuration with illumination light at a given angle. For example, DLP™ based DMDs have illumination angles of about 24°, while other DLP™ based DMDs have illumination angles of about 34°, though other given angles are within the scope of present implementations. Indeed, a given illumination angle of a DMD selected for use with device 100 is generally used to selecting the angle 130, as well as in selecting the optics 114. Indeed, each of the DMDs 101, 102 can have the same illumination angle, or each of the DMDs 101, 102 can have illumination angle different from one another. However, regardless of the illumination angle of each of the DMDs 101, 102, the positions of each of the DMDs, 101, 102, the position of the at least one optical device 117, including the angle 130, and the optics 114 are selected such that the Scheimpflug condition is met Indeed, the parameters of device 100, including the angle 130 can further be selected using optical modelling software, using a desired physical configuration of the components of the device 100. For example, a certain configuration of the optics 114 may be desired such that the device 100 has a given physical footprint and/or each of the DMDs 101, 102 can have a given set of operational conditions (including, but not limited to an angle of illumination in a forward configuration).

In any event, such a configuration of device 100 allows both DMDs 101, 102 to be operated in a forward configuration, which generally allows a more efficient operation of a projector into which device 100 is incorporated, as compared to similar projectors that use a first DMD in a reverse configuration.

It is yet further appreciated that while devices 10, 100 include only one optical device configured to: tilt a subject plane of a first DMD to an equivalent tilted subject plane, in yet further implementations, more than one optical device can be used to tilt the subject plane of the first DMD to an equivalent tilted subject plane.

Figure 4:
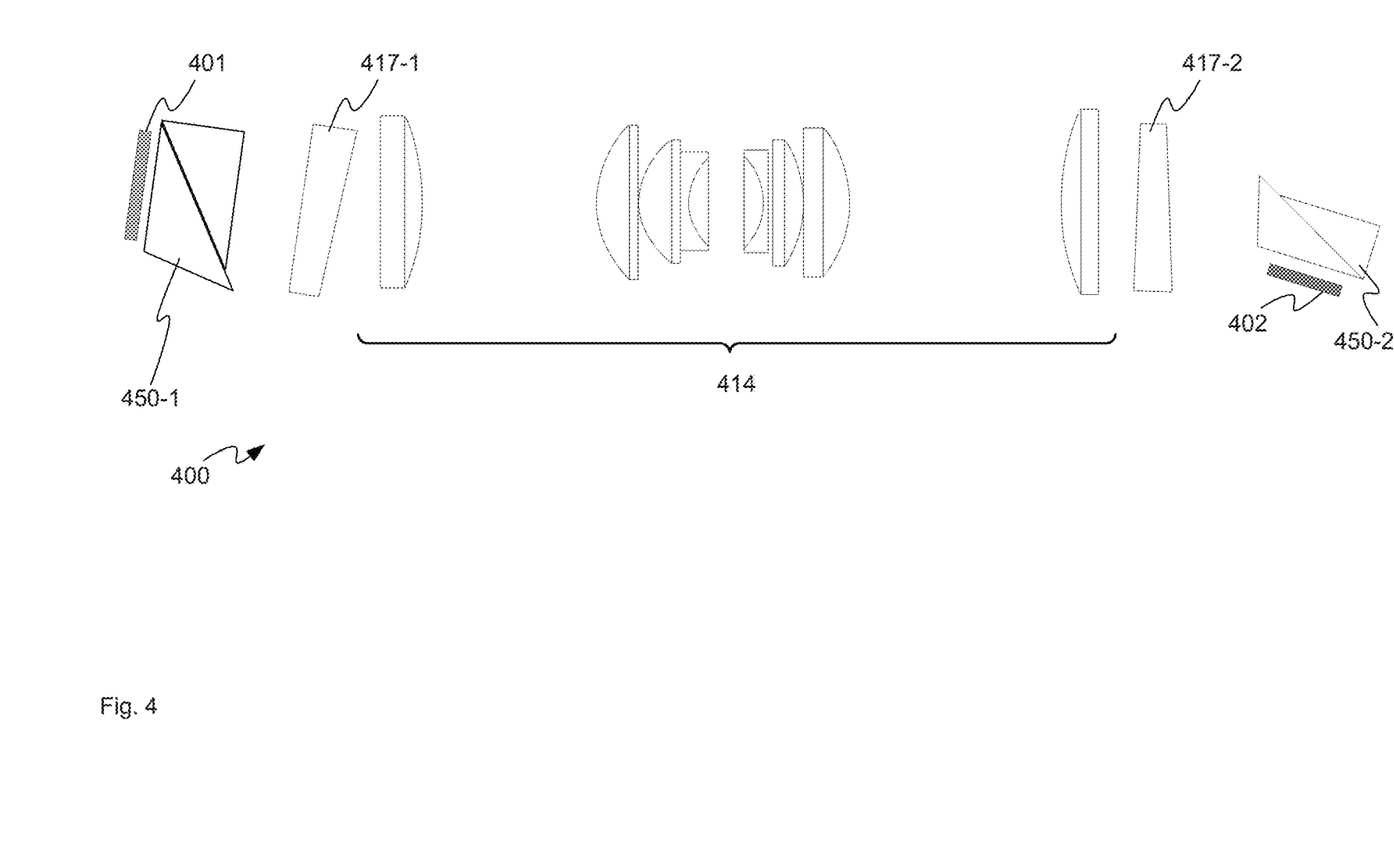
FIG. 4 depicts another specific implementation of the device of FIG. 1, according to non-limiting implementations.
Figure 5:
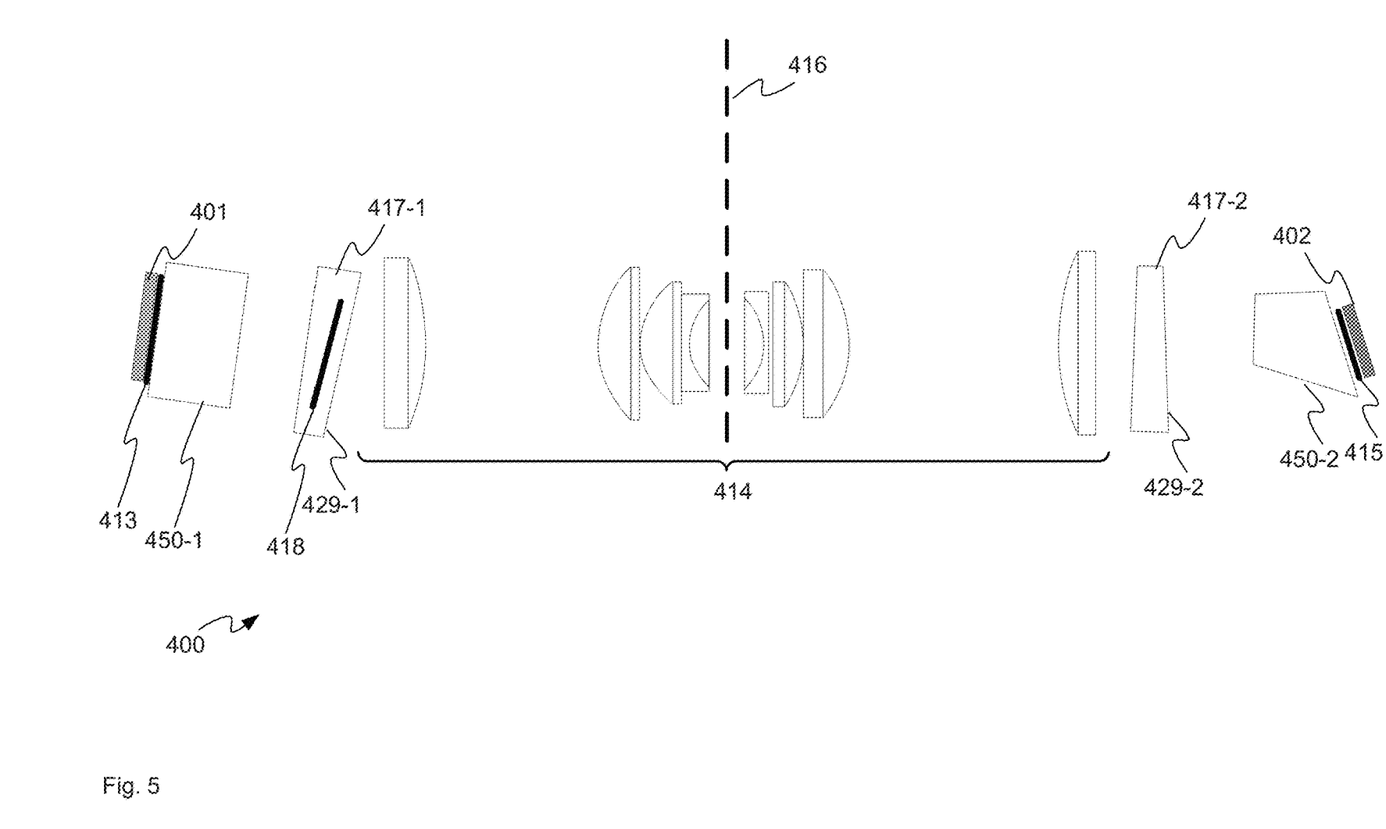
FIG. 5 depicts an unfolded version of the optics of the device of FIG. 4, according to non-limiting implementations.

For example, attention is next directed to FIG. 4 and FIG. 5, each of which depict a device 400 that can be used with, and/or incorporated into, a high dynamic range ("HDR") projector. FIG. 4 depicts a schematic side view of the device 400, including example optics, and FIG. 5 depicts a schematic side view of the device 400 with the optics of the device 400 unfolded (e.g. reflections from mirrors and/or reflective surfaces are removed for clarity with the optical path through the device 400 depicted without reflections). Furthermore, it is understood that the device 400 is not depicted to scale in either of FIG. 4 or FIG. 5. While device 400 is generally more complex than device 10, device 400 generally operates according to the same principles of device 10, as described hereafter.

With reference to both FIG. 4 and FIG. 5, the device 400 generally comprises: a first DMD 401, a second DMD 402, each operated in a forward configuration, such that each is illuminated at a respective non-normal angle and a respective output image is reflected at a normal angle, a subject plane 413 of the first DMD 401 being parallel to the first DMD 401; optics 414 between the first DMD 401 and the second DMD 402, the optics 414 configured to convey light reflected from the first DMD 401 to illuminate an image plane 415 at the second DMD 402 in the forward configuration, the optics 414 including an equivalent lens plane 416; and a plurality of optical devices 417-1, 417-2 between the first DMD 401 and the second DMD 402, the plurality of optical devices 417-1, 417-2 configured to: tilt the subject plane 413 of the first DMD 401 to an equivalent tilted subject plane 418, the equivalent lens plane 416, the equivalent tilted subject plane 418 and the image plane 415 all intersecting at a Scheimpflug intersection (not depicted, but assumed to be nonetheless present, for example off the page of FIG. 5).

Device 400 further comprises a respective TIR prism 450-1, 450-2 at each of the DMDs 401, 402 configured to convey illumination light to a respective DMD 401, 402 and convey a respective output image away from the respective DMD 401, 402 (e.g. the illumination light for the second DMD 402 comprising the respective output image of the first DMD 401). Each of the TIR prism 450-1. 450-2 can be a component of the optics 414.

Furthermore, the optics 414 otherwise comprises eight lenses symmetrically arranged along an optical path between the DMDs 401, 402; again, it is appreciated that the optics 414 can be modelled using a single lens as in device 10, having the equivalent lens plane 416.

It is appreciated that the subject plane 413, the equivalent lens plane 416, the equivalent tilted subject plane 418 and the image plane 415 are depicted in FIG. 5, but not FIG. 4, for clarity. For example, in the unfolded view of device 400, the relative angles between the subject plane 413, the equivalent lens plane 416, the equivalent tilted subject plane 418 and the image plane 415 are clearer as reflections due to mirrors and/or reflecting surfaces are removed.

As with at least one optical device 17, the plurality of optical devices 417-1, 417-2 are further configured to: tilt the subject plane 413 of the first DMD 401 to the equivalent tilted subject plane 418 such that the image plane 415 at the second DMD 402 is in uniform focus and/or is in substantially uniform focus at the respective non-normal angle.

As depicted, the plurality of optical devices 417-1, 417-2 include a plurality of wedge prisms distributed between the first DMD 401 and the second DMD 402. For example, optical device 417-1 comprises a first wedge prism having an exit face 429-1 angled with respect to the subject plane 418, and optical device 417-2 comprises a second wedge prism having an exit face 429-2 also angled with respect to the subject plane 418. While the first wedge prism (e.g. optical device 417-1) is located before optics 414 (and after the TIR prism 450-1), and the second wedge prism (e.g. optical device 417-2) is located after optics 114 (and before the TIR prism 450-2), it is appreciated that the total effect of the two wedge prisms on the subject plane 413, with respect to the image plane 415, is to tilt the subject plane 413 of the first DMD 401 to the equivalent tilted subject plane 418.

Indeed, device 400 demonstrates that any number of optical devices can be used to tilt the subject plane of a first DMD, operated in a forward configuration, to an equivalent tilted subject plane such that the equivalent tilted subject plane, an equivalent lens plane and an image plane intersect at a Scheimpflug intersection and/or meet the Scheimpflug condition.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a first digital micromirror device (DMD) and a second DMD each operated in a forward configuration, such that each is illuminated at a respective non-normal angle and a respective output image is reflected at a normal angle, a subject plane of the first DMD being parallel to the first DMD;
optics between the first DMD and the second DMD, the optics configured to convey light reflected from the first DMD to illuminate an image plane at the second DMD in the forward configuration, the optics including an equivalent lens plane; and
at least one optical device between the first DMD and the second DMD, the at least one optical device configured to: tilt the subject plane of the first DMD to an equivalent tilted subject plane such that the image plane at the second DMD is in uniform focus at the respective non-normal angle, the equivalent lens plane, the equivalent tilted subject plane and the image plane all intersecting at a Scheimpflug intersection.

2. The device of claim 1, wherein the at least one optical device includes a prism with an exit face at an angle tilted relative to the subject plane of the first DMD.

3. The device of claim 1, wherein the at least one optical device includes a plurality of wedge prisms distributed between the first DMD and the second DMD.

4. The device of claim 1, wherein the at least one optical device includes a prism configured to convey illumination light to the subject plane of the first DMD at the respective non-normal angle and convey the respective output image through an exit face of the prism, the exit face at an angle relative to the subject plane, the angle being greater than zero, and the angle selected to optically tilt the subject plane of the first DMD to the equivalent tilted subject plane.

5. The device of claim 1, wherein the optics includes a prism configured to convey illumination light from the first DMD to the image plane of the second DMD at the respective non-normal angle and convey the respective output image of the second DMD through a respective exit face.

6. The device of claim 1, wherein the optics includes one or more lenses.

7. The device of claim 1, wherein the optics includes one or more apertures.

8. The device of claim 1, wherein the first DMD is further operated in a pre-modulator mode and the second DMD is further operated in a prime-modulator mode.

9. The device of claim 8, wherein the first DMD is modulated using first image data, and the second DMD is modulated using second image data determined from one or more of the first image data, a target projected image and a pixel spread function of the device.

10. A device comprising:
a first digital micromirror device (DMD) and a second DMD each operated in a forward configuration, such that each is illuminated at a respective non-normal angle and a respective output image is reflected at a normal angle, a subject plane of the first DMD being parallel to the first DMD;
optics between the first DMD and the second DMD, the optics configured to convey light reflected from the first DMD to illuminate an image plane at the second DMD in the forward configuration, the optics including an equivalent lens plane; and
at least one optical device between the first DMD and the second DMD, the at least one optical device configured to: tilt the subject plane of the first DMD to an equivalent tilted subject plane, the equivalent lens plane, the equivalent tilted subject plane and the image plane all intersecting at a Scheimpflug intersection,
wherein the at least one optical device includes a prism configured to convey illumination light to the subject plane of the first DMD at the respective non-normal angle and convey the respective output image through an exit face of the prism, the exit face at an angle relative to the subject plane, the angle being greater than zero, and the angle selected to optically tilt the subject plane of the first DMD to the equivalent tilted subject plane.

11. The device of claim 10, wherein the at least one optical device is further configured to: tilt the subject plane of the first DMD to the equivalent tilted subject plane such that the image plane at the second DMD is in uniform focus at the respective non-normal angle.

12. The device of claim 10, wherein the optics includes a prism configured to convey illumination light from the first DMD to the image plane of the second DMD at the respective non-normal angle and convey the respective output image of the second DMD through a respective exit face.

13. The device of claim 10, wherein the optics includes one or more lenses.

14. The device of claim 10, wherein the optics includes one or more apertures.

15. The device of claim 10, wherein the first DMD is further operated in a pre-modulator mode and the second DMD is further operated in a prime-modulator mode.

16. The device of claim 15, wherein the first DMD is modulated using first image data, and the second DMD is modulated using second image data determined from one or more of the first image data, a target projected image and a pixel spread function of the device.

* * * * *